(12) United States Patent
Nicol et al.

(10) Patent No.: US 11,288,260 B2
(45) Date of Patent: Mar. 29, 2022

(54) METHOD AND SYSTEM FOR DETECTING ANOMALIES IN A DATA PIPELINE

(71) Applicant: OVH, Roubaix (FR)

(72) Inventors: Olivier Nicol, Tourcoing (FR); Laurent Parmentier, Marcq-en-Baroeul (FR); Pauline Wauquier, Coutiches (FR)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 17/306,265

(22) Filed: May 3, 2021

(65) Prior Publication Data

US 2021/0374123 A1 Dec. 2, 2021

(30) Foreign Application Priority Data

May 29, 2020 (EP) .................................... 20315288

(51) Int. Cl.
*G06F 16/23* (2019.01)
*G06F 17/18* (2006.01)

(52) U.S. Cl.
CPC .......... *G06F 16/2365* (2019.01); *G06F 17/18* (2013.01)

(58) Field of Classification Search
CPC ........... H04L 63/1425; G06F 16/90344; G06F 17/18; G06F 9/3867; G06F 16/2474
See application file for complete search history.

(56) References Cited

U.S. PATENT DOCUMENTS

| | | | |
|---|---|---|---|
| 6,597,907 B1 * | 7/2003 | Pruitt | H04L 41/0681 455/423 |
| 8,175,843 B2 * | 5/2012 | Kubiak | G16H 70/40 702/179 |
| 10,193,901 B2 * | 1/2019 | Muddu | G06F 16/9024 |
| 11,024,019 B2 * | 6/2021 | Amthor | G06T 7/0002 |
| 11,042,145 B2 * | 6/2021 | Zhang | G06F 11/3006 |
| 11,107,113 B2 * | 8/2021 | Rajasekharan | G06Q 30/0242 |
| 2010/0169026 A1 * | 7/2010 | Sorenson | G16B 30/00 702/20 |
| 2019/0121889 A1 * | 4/2019 | Gold | G06F 16/2255 |
| 2019/0347670 A1 * | 11/2019 | Abramson | G06F 17/18 |
| 2020/0210393 A1 * | 7/2020 | Beaver | G06F 17/18 |
| 2020/0210826 A1 * | 7/2020 | Liu | G01N 27/82 |

FOREIGN PATENT DOCUMENTS

EP          3258426 A1      12/2017

OTHER PUBLICATIONS

Extended European Search Report with regard to the EP Patent Application No. 20315288.9 dated Nov. 17, 2020.

(Continued)

*Primary Examiner* — Merilyn P Nguyen
(74) *Attorney, Agent, or Firm* — BCF LLP

(57) ABSTRACT

A method and system for detecting anomalies in a data pipeline are disclosed. Data tables are extracted from data pipelines. A best time column is calculated for each data table. Table lines are aggregated so as to establish counts of data lines per a time interval, and corresponding sequences of points are produced that are being analysed through regression methods. An anomaly is raised when points have counts of data lines that lie outside confidence intervals around expected values for such counts.

12 Claims, 11 Drawing Sheets

(56) References Cited

OTHER PUBLICATIONS

Sejun et al., "Fast Detection of Abnormal Data in IIoT with Segmented Linear Regression", Proceedings on the International Conference on Internet Computing (ICOMP), Jan. 1, 2019, Athens, XP055746426, pp. 88-94.

Anonymous, "Excel Tutorial on Linear Regression", May 28, 2002, XP055746938, URL:http://science.clemson.edu/physics/labs/tutorials/excel/regression.htm [retrieved on Nov. 4, 2020]; 4 pages.

\* cited by examiner

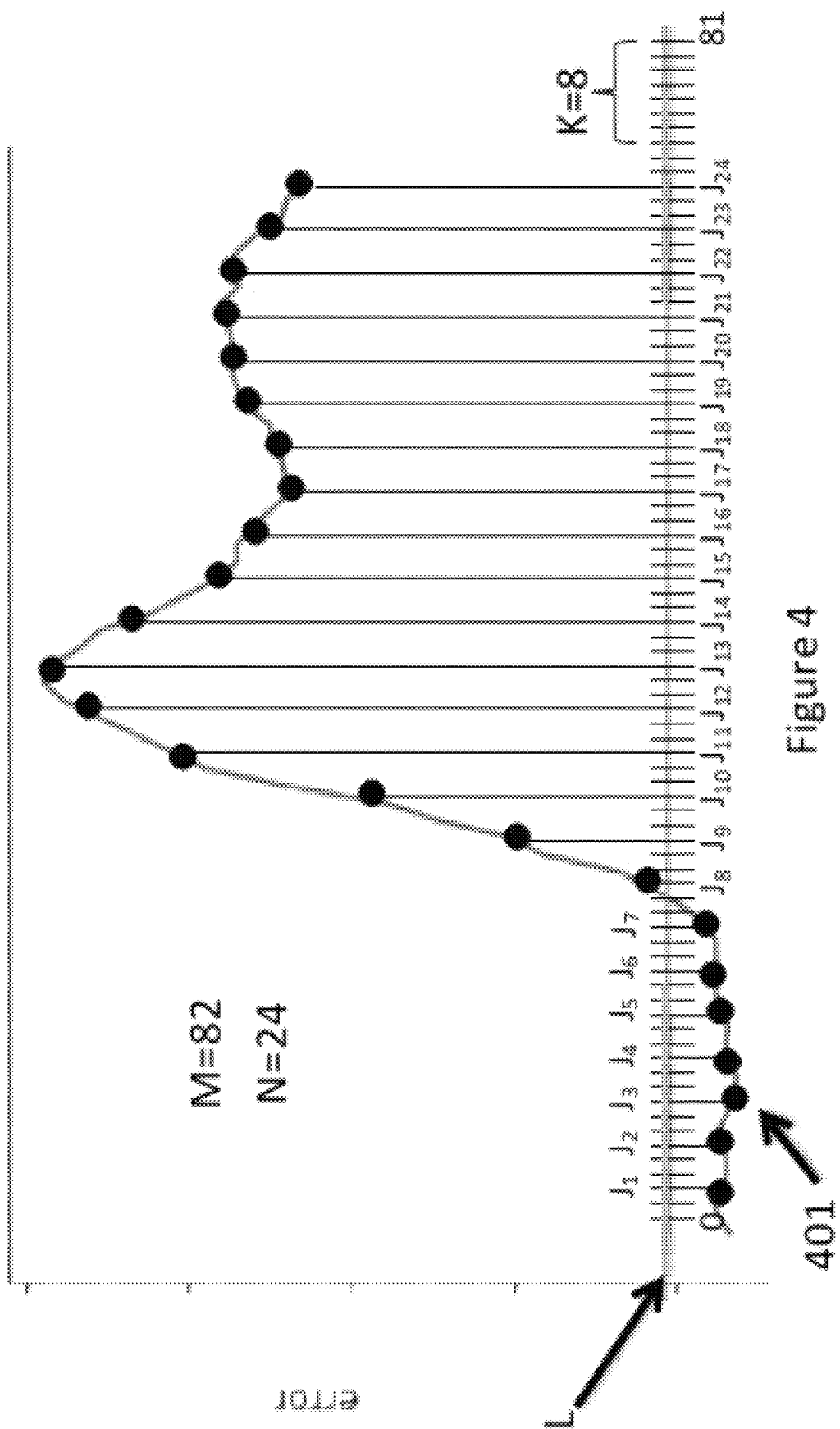

METHOD AND SYSTEM FOR DETECTING ANOMALIES IN A DATA PIPELINE

CROSS-REFERENCE

The present application claims priority from European Patent Application No. 20315288.9, filed on May 29, 2020, the disclosure of which is incorporated by reference herein in its entirety.

FIELD

The present technology relates to data processing, more particularly to a method and system for detecting anomalies in a data pipeline.

BACKGROUND

Data centers and cloud infrastructure, in order to provide mutualized hosting services to large numbers of clients, are often populated with large numbers of many different processing technologies and components of diverse and heterogeneous nature (hardware, software, networking, . . . ). Service demands from the clients usually vary over time and may be very intense at times. The health of a data center or cloud infrastructure is thus monitored in order to optimize its capability to meet the quality of service that clients expect.

"Data pipeline" as defined herein is a directed acyclic graph of jobs or programs, for example run in a data center or cloud infrastructure. These jobs or programs receive as input data that may have been processed by other jobs or programs, process these data, and output resulting data that may in turn be used as input to yet other jobs or programs. A data pipeline is therefore extremely complex, involving different computing technologies and systems, for example as integrated in the data center or cloud infrastructure. Monitoring the health of a system data center may include monitoring the data pipeline(s) generated by such computing technologies and systems.

Monitoring the health of each and every such computing technologies or systems may prove quasi-impossible. Monitoring the health of a system data center through anomaly detection in data pipelines at aggregated levels may prove useful, to the extent it does not permit the failure of an individual computing technology or system to go unnoticed for a significant amount of time. There is therefore a need for a method and system that allows early and accurate (ie: without too many false positives) detection of anomalies in a data pipeline.

Generally speaking, the present technology aims at monitoring a data pipeline (ie: without monitoring individual computing technologies or systems) by checking that data appear plausible using machine learning techniques.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art. In particular, such shortcomings may comprise:

inability to detect anomalies in all the heterogeneous input and output data sources manipulated by a data pipeline, without less than significant knowledge of the content or characteristics of the data sources;

requirements for intensive computational power involved;

requirements to define rules or thresholds to define what constitutes a data anomaly; and inability to capture data seasonality and trends accurately.

In one embodiment, various implementations of the present technology provide a method and system for detecting anomalies in a data pipeline, wherein a Reader extracts data tables from a Source Dataset at a node of the data pipeline, the method comprising the steps of:

receiving by a Table Analyser from the Reader a first data table;

retaining by the Table Analyser a column of the first data table with a time dimension as a candidate time column, and forming a first sequence of points, each point having as one dimension a time interval, and as another dimension a count of data lines per time interval in the first data table;

forming by the Table Analyser a second sequence of M points by setting aside points from the first sequence for a first number of time intervals immediately preceding the last time interval;

providing by the Table Analyser the second sequence to a Breakpoint Finder;

calculating by the Breakpoint Finder a first regression for the second sequence, and receiving by the Table Analyser the first regression for the second sequence;

applying by the Table Analyser the first regression on the time intervals of the set aside points, obtaining first predicted values for the corresponding counts of data lines, and calculating a first error representative of the difference between the first predicted values and the actual values for the counts of data lines for each of the time intervals of the set aside points;

repeating by the Table Analyser the retaining, forming, providing, receiving and applying, on columns in the first data table having a time dimension, and retaining as the best time column for the first data table the candidate column yielding the smallest calculated first error;

storing by the Table Analyser the first sequence for the best time column in a Data table;

receiving by a Table Aggregator from the Reader the first data table updated with at least one additional time interval, and corresponding count of data lines;

forming by the Table Aggregator a third sequence of P points, each point having as one dimension the time interval, and as another dimension a count of data lines per time interval in the updated first data table;

storing by the Table Aggregator the third sequence in the Data table, as a substitute for the first sequence;

calculating by an Anomaly Detector for a first selection of time intervals in the third sequence a confidence interval with a center being the value for the count of data lines predicted by a regression received from the Trainer; and raising by the Anomaly Detector an anomaly if the actual value for the count of data lines for any time interval of the first selection lies outside the confidence interval.

In another embodiment, various implementations of the present technology provide a method and system wherein the calculating by an Anomaly Detector a confidence interval for a first selection of time intervals in the third sequence comprises:

receiving from the Data table the third sequence;
providing the third sequence to a Trainer;
receiving from the Trainer a second regression for the third sequence;
applying the second regression on all time intervals in the third sequence, and obtaining second predicted values for the corresponding counts of data lines for the time intervals of the first selection in the third sequence;
calculating a second error representative of the difference between the second predicted values and the actual values for the counts of data lines for each of the time intervals of the first selection; and
calculating for each time interval of the first selection in the third sequence a confidence interval with a center being the second predicted value, and bounded by plus or minus a first factor times the second error.

In yet another embodiment, various implementations of the present technology provide a method and system wherein the calculating by the Anomaly Detector a second error comprises:

forming a fourth sequence of points, each point having as one dimension the time interval, and as another dimension an absolute value of the difference between the second predicted value and the actual value for the count of data lines for each of the time intervals of the first selection;
providing the fourth sequence to the Trainer;
receiving from the Trainer a third regression for the fourth sequence;
wherein the second error is, for each time interval of the first selection in the third sequence, the value predicted by the third regression for that time interval.

In yet another embodiment, various implementations of the present technology provide a method and system wherein the calculating by the Breakpoint Finder a first regression for the second sequence of M points comprises:

retaining a time interval $M'_i$ of one of the points in the second sequence;
providing to the Trainer the second sequence and $M'_i$ as a hypothetical breakpoint;
calculating by the Trainer a fourth regression for the second sequence and $M'_i$ as a hypothetical breakpoint, and receiving the fourth regression for the second sequence;
applying the fourth regression on M'', M''<(M−M'), time intervals immediately preceding the last time interval for the points in the second sequence, obtaining fourth predicted values for the corresponding counts of data lines, and calculating a third error representative of the difference between the fourth predicted values and the actual values for the counts of data lines for each of M'' time intervals for the points in the second sequence;
repeating the retaining, providing, calculating and applying for all time intervals $M'_i$, i∈[1, N], N<M, N being a selection of points in the second sequence;
retaining as the best breakpoint for the second sequence the time interval $M'_i$ closest to the last time interval in the second sequence and yielding a calculated third error below a predetermined value L, and the corresponding fourth regression as the first regression for the second sequence provided to the Table Analyzer; and
storing the best breakpoint for the first sequence in a Breakpoint table.

In yet another embodiment, various implementations of the present technology provide a method and system further comprising calculating by the Breakpoint Finder an updated best breakpoint for the updated first data table, comprising:

receiving the third sequence of P points from the Data table;
retaining a time interval $P'_i$ of one of the points in the third sequence;
providing to the Trainer the third sequence and $P'_i$ as a hypothetical breakpoint;
calculating by the Trainer a fifth regression for the third sequence and $P'_i$ as a hypothetical breakpoint, and receiving the fifth regression for the third sequence;
applying the fifth regression on P''', P'''<(P−P'), time intervals immediately preceding the last time interval for the points in the third sequence, obtaining fifth predicted values for the corresponding counts of data lines, and calculating a fourth error representative of the difference between the fifth predicted values and the actual values for the counts of data lines for each of P''' time intervals for the points in the third sequence;
repeating the retaining, providing, calculating and applying for all time intervals $P'_i$, i∈[1, Q], Q<P, Q being a selection of points in the third sequence;
retaining as the best breakpoint for the third sequence the time interval $P'_i$ closest to the last time interval in the third sequence and yielding a calculated fourth error below a predetermined value R; and
storing the best breakpoint for the third sequence, in the Breakpoint table.

In yet another embodiment, various implementations of the present technology provide a method and system further comprising performing by the Table Analyser, after the retaining the best time column for the first data table:

selecting a column of the first table other than a column with a time dimension;
counting data lines per time interval for each of the values in the selected column;
retaining as a category each of the values for which the total count of data lines exceeds a predetermined number S, and the count of data lines per time interval exceeds a predetermined number T for at least a predetermined percentage U of the time intervals for the selected column;
forming a sequence of points for each category, each point having as one dimension the time interval and as another dimension the count of data lines per time interval for the value of the category; and
storing the sequence for each category in the Data table.

In the context of the present description, unless expressly provided otherwise, a system, may refer, but is not limited to, an "electronic device", an "operation system", a "computing system", a "computer-based system", a "controller unit", a "monitoring device", a "control device" and/or any combination thereof appropriate to the relevant task at hand.

In the context of the present specification, the expression "FPGA" is intended to include Field Programmable Gate Array computing systems, available on the market at the time of filing this patent application, such as references Xilinx VU9P, or Intel Stratix V, and any subsequent equivalent technologies becoming available, regardless of their name, consisting in computing system hardware programmable with software.

In the context of the present description, the expression "processor" in intended to include a single dedicated processor, a single shared processor, or a plurality of individual processors, some of which may be shared. In some aspects of the present technology, the processor may be for example a general purpose processor, such as a central processing unit (CPU), a processor dedicated to a specific purpose, or a processor implemented in a FPGA. Other hardware, conventional and/or custom, may also be included.

In the context of the present description, the functional steps shown in the figures, may be provided through the use of dedicated hardware, as well as hardware capable of executing software in association with appropriate software.

Still in the context of the present description, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present description, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 illustrates the choice of a best breakpoint for a sequence of points;

It should be noted that, unless otherwise explicitly specified herein, the drawings are not to scale. Further, elements that are identical from one figure to the next share the same reference numerals.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Figure 1:
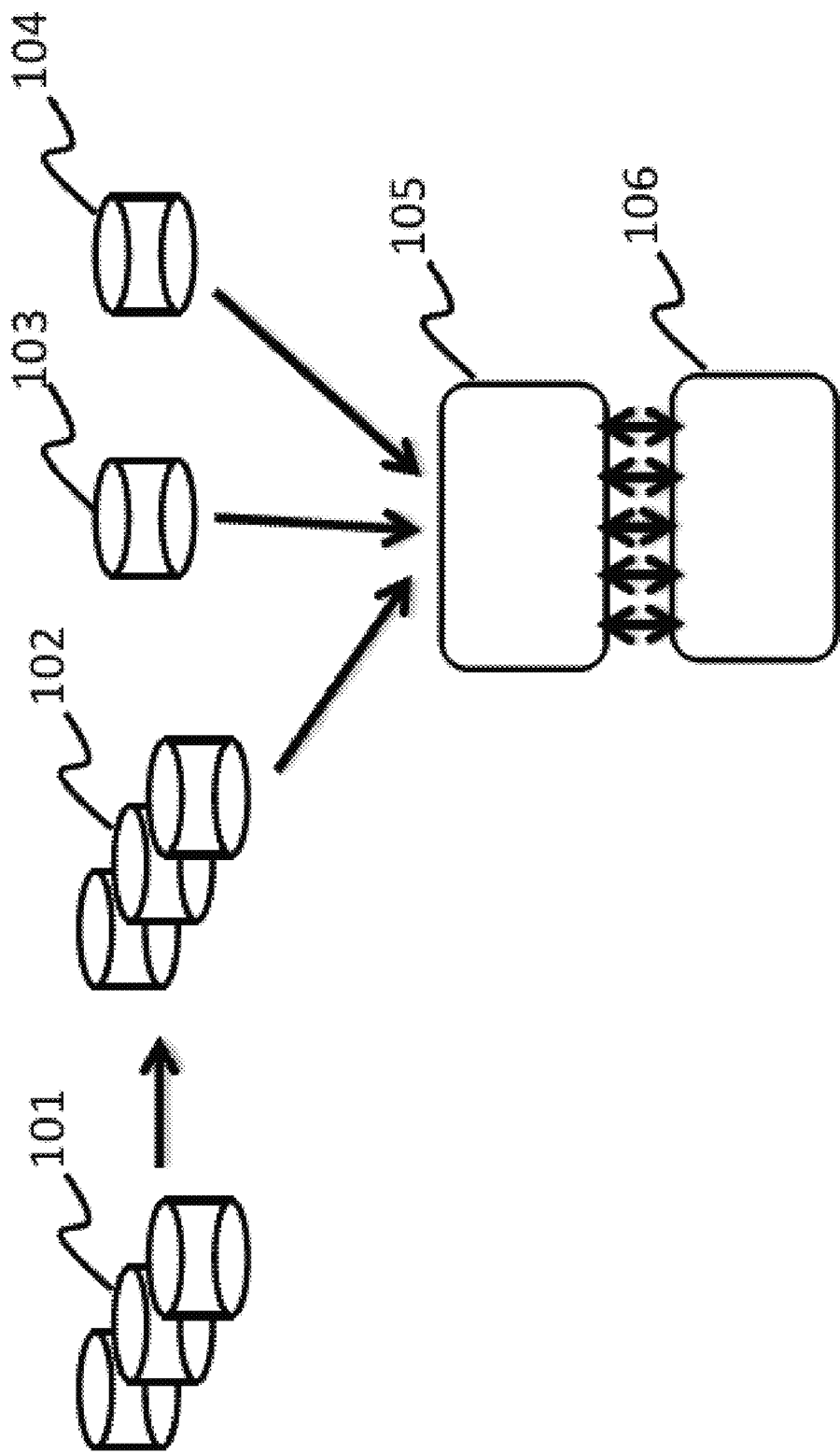
FIG. 1 depicts a data center or cloud infrastructure as an exemplary environment in which the method and system according to the present technology may be implemented.

FIG. 1 depicts a data center or cloud infrastructure exemplary environment in which the present method and system may be implemented. Various databases 101, 102, 103 and 104 may be involved. Database 102 may be a replication of data center or cloud infrastructure production databases 101. This may be implemented for example to avoid adding computational stress to the computing technologies and systems comprised in the data center or cloud infrastructure. Databases 101 may be equipped with relational database management systems such as, without limitations, PostgreSQL, MySQL, MongoDB, or OpenTSDB. Database 103 may be a database of already parsed, and as the case may, timestamped data, such as for example a log database for the data center or cloud infrastructure. Database 104 may include data with different characteristics and/or volume necessitating building a data pipeline using stream processing framework tools such as Apache Flink and Apache Kafka. Data with yet different characteristics and/or volume may be handled by the present technology, such as open data, in batch, streaming, or interactive workflows, and the generality of the teachings herein is not affected by what merely constitutes an illustration of a possible data center or cloud infrastructure environment in which the present method and system may be implemented.

In this environment bloc 105 represents data transforming and processing technologies for data gathered from databases 102-104. Such data may be accumulated using for example Fog Nodes in combination with Apache Kafka, or Apache Flume. Bloc 106 represents an HDFS, HBase or Solr, where, for example, an Apache Flume agent may write events read from Apache Kafka.

Figure 2:
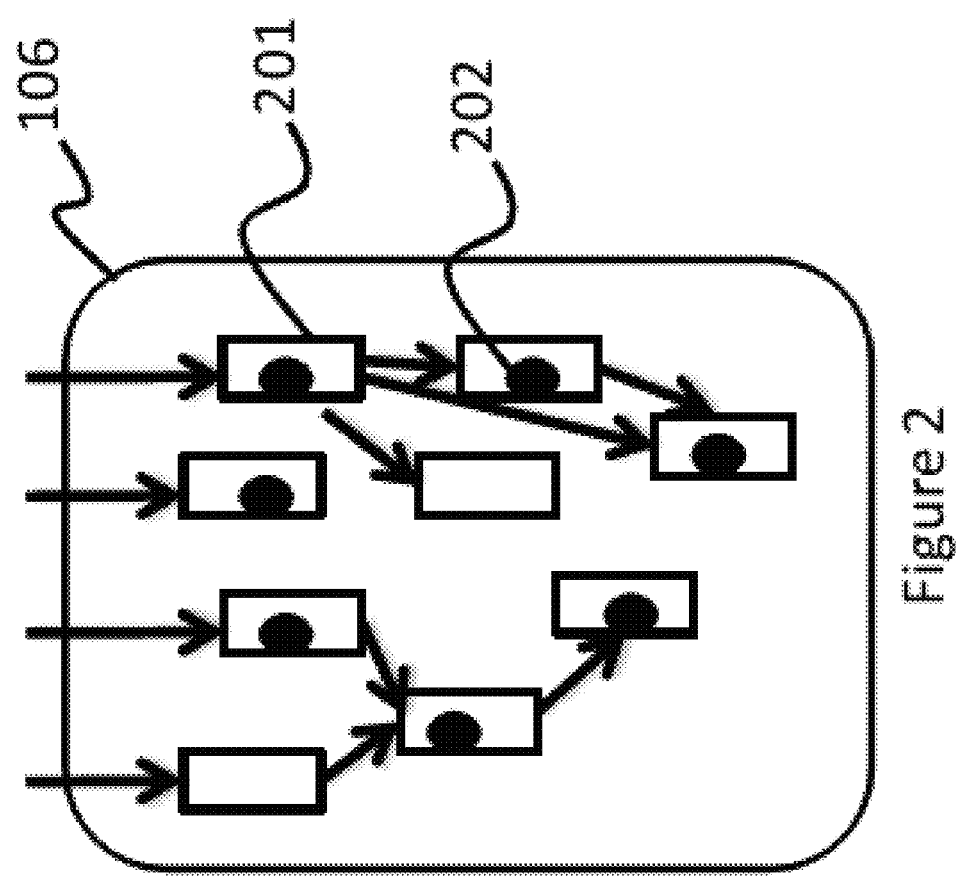
FIG. 2 depicts a data pipeline in which the method and system according to the present technology may be deployed.

Bloc 106 is detailed in FIG. 2. A data pipeline is generated using for example, Spark Streaming. Through its ability to combine and cross boundaries between batch, streaming, and interactive workflows, Spark Streaming enables to get insights from data at time intervals. Nodes of the pipeline are represented as a plurality of rectangles 201 therein, as Source Datasets. A plurality of dots 202 represent data source readers ("Reader" below) allowing to analyse a particular dataset at various time intervals according to the present technology. In this environment, anomalies may be detected in all the heterogeneous input and output data sources manipulated by a data pipeline.

Figure 3A:
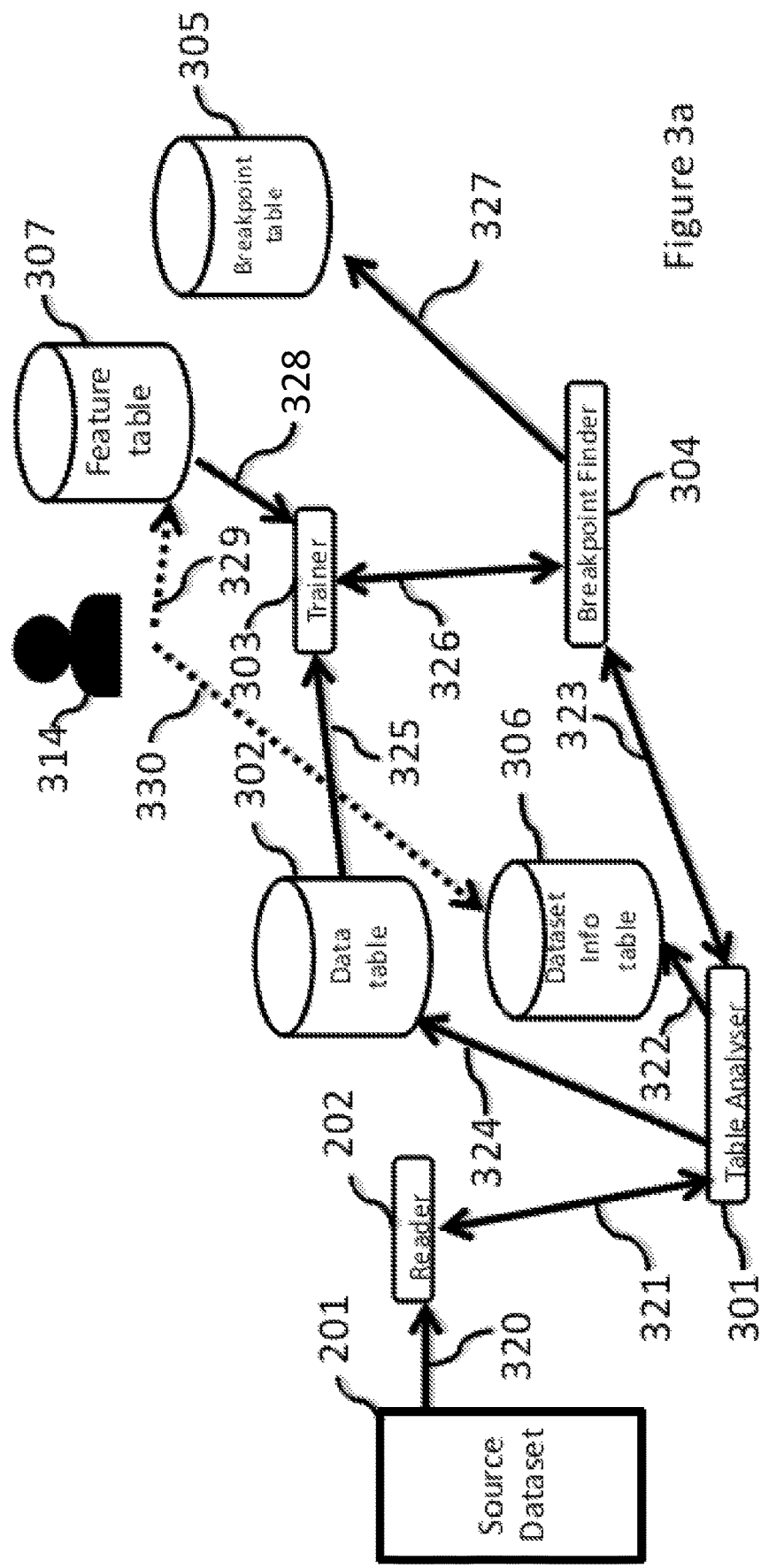
FIGS. 3a-3b depict components of the present technology, and the interactions between them in various functionality configurations according to the present technology.
Figure 3B:
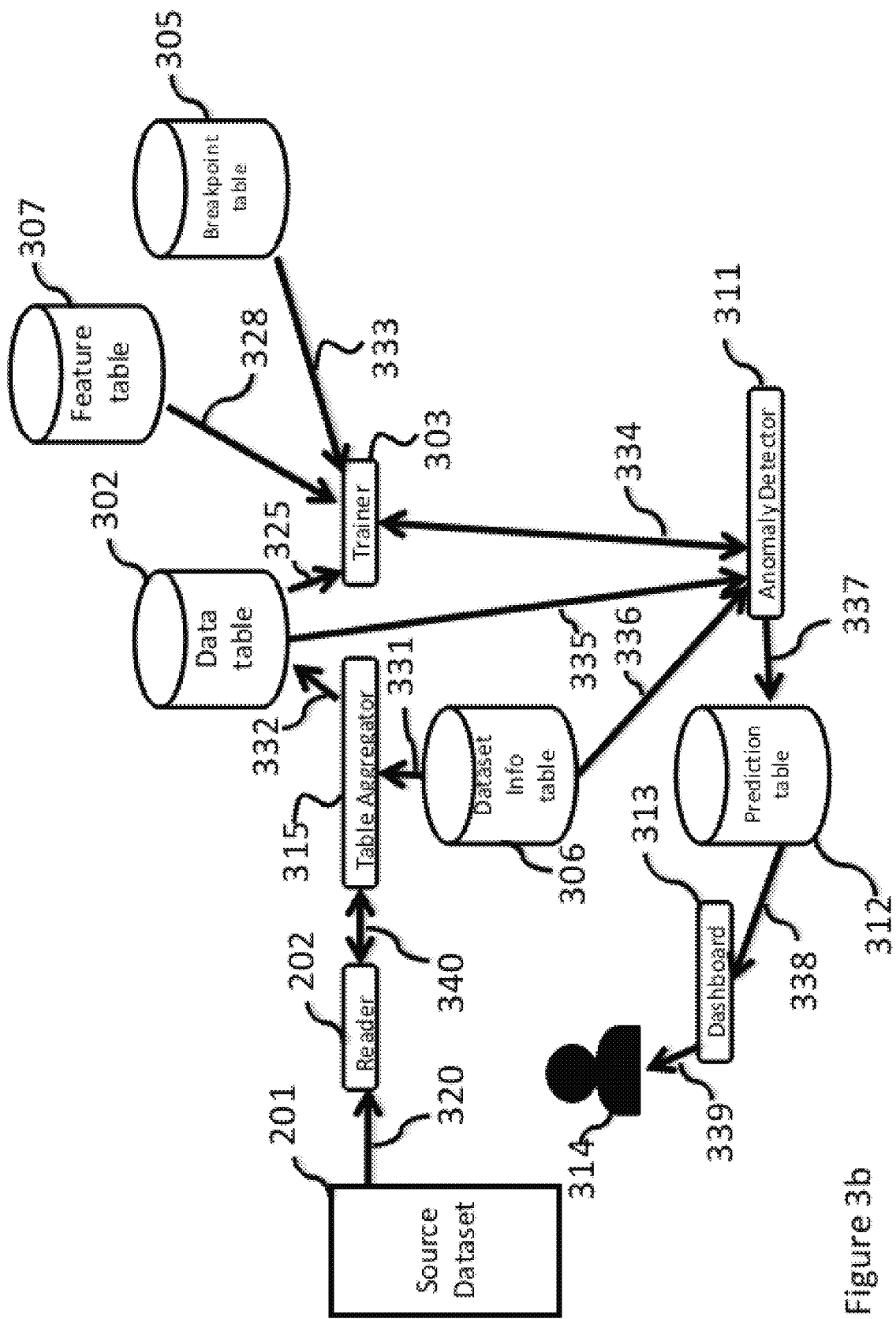

FIGS. 3a-3b depict various components of the present system, and the interactions between them in various functionality configurations according to the present technology. Merely for the sake of clarity, two functionalities are separately presented, respectively data analysis (FIG. 3a) and anomaly detection (FIG. 3b). It will be apparent to the person skilled in the art, that should not be inferred from this manner of presenting, any temporal relation between the functionalities, and that the two functionalities may operate in parallel and/or asynchronously.

FIG. 3a depicts components of the present technology, and the interactions between them in a data analysis functionality configuration. The components are as follows:

The Reader 202: may connect through link 320 to the Source Dataset 201 (from FIG. 2). Source Dataset 201 may consist of tables, and Reader 202 may connect to the Source Dataset 201 using standard connectors, such as: csv, parquet, jdbc. Given a table location and a given protocol in Source Dataset 201, Reader 202 may read data from the table and its schema. In most cases (parquet, jdbc . . . ) the schema is available. Otherwise, in case of a csv or json file for example, the schema may need to be inferred, using for example an Apache Spark library. Reader 202 may present a data query interface that allows other components in the system to make queries (such as for example, data aggregation for time intervals, categories, or data filters), pass on such queries to Source Dataset 201, and return to querying components the result of the query. For a Table Analyser 301, this is done through link 321.

The Table Analyser 301: may access through link 321 data from Reader 202 under the form of tables or data aggregated per time interval. Table Analyser 301 may store sequences of time series data in a Data table 302 through link 324, and metadata about such sequences in a Dataset Info table 306 through link 322. Table Analyser 301 may further request of a Breakpoint Finder 304 through link 323, to analyse sequences of data and calculate a breakpoint that it may return to the Table Analyser 301 through link 323.

The Breakpoint Finder 304: may request of a Trainer 303 through link 326, to train over a sequence of data and return to it data predictive models through link 326. Breakpoint Finder 304 may further calculate and store breakpoint information about a sequence of data through link 327 in a Breakpoint table 305.

The Trainer 303: may further read sequences of data through link 325 from Data table 302. In addition it may read features (such as in relation to particular events, having or not a seasonality) from a Feature table 307, through a link 328.

A User 314: may optionally input or override values in Dataset Info table 306 and/or Feature table 307 through respectively links 330 and 329.

A functional description of the above components and their interaction will now be provided. The Table Analyser 301 may be run on any table available in Source dataset 201, when a new table enters the Source Dataset 201, periodically (for example at given multiples of time intervals), and/or when the structure of a table varies significantly.

The Table Analyser 301 may decide how to best detect anomalies in a table received from the Reader 202, by selecting a "best" (from the point of view of anomaly detection) time column in such table. To that effect:

in a first step, the Table Analyser 301 may request for each analysed table, the table schema from Reader 202 (if available, otherwise inferred as explained above), and retain columns such as of the date/time type (ex: 2019-10-17 13:15:00) or timestamp (ex: unix timestamp) identified in the schema, ie that have a time dimension. Optionally, Table Analyser 301 may interpret a column with integer values as a unix timestamp: from such a column, Table Analyser 301 may generate different columns with a time dimension assuming respectively that the integer values are expressed in seconds, milliseconds, nanoseconds, etc. Such generated columns may then be retained as time columns. For each such retained time column, a sequence of points is stored in data Table 302 by Table Analyser 301. One of the dimensions of these points may be a time interval such as a discrete time value (e.g. second, hour, day, week, month, etc.). Another component may be a count of data lines in the table aggregated per time interval. The time interval value is the same for an instance of the whole system, similar to a system "clock unit", and all components use the same time interval value. The sequence may span two years of data with a time interval of a day as an example;

in a second step, Table Analyser 301 may iterate over each of the retained time columns, toward selecting the "best" time column for a table. To that effect, Table Analyser 301 may set aside, for each full sequence of points, the points for a number of most recent time intervals. For example, the last 10 time intervals. The actual number of most recent time intervals may be decided after verifying that a predetermined % within the range of corresponding points, do not have a value of "0". For example 50% may be used. The remainder of the sequence (as "truncated sequence" hereafter) may be fed to the Breakpoint Finder 304. Breakpoint Finder 304 may then, with the assistance of the Trainer 303, as will be detailed below, determine a predictive model for each truncated sequence, that involves, as will be detailed below, calculating a breakpoint for the truncated sequence, as well as a regression, for example a linear regression, and return such predictive model through link 323, while storing the breakpoint in Breakpoint table 305 through link 327. Table Analyser 301 may then test the predictive model against the set aside points for a number of most recent time intervals, and retain the time column as the "best" one per table, which yields the smallest discrepancy between actual values and predicted values of the set aside points.

Optionally, User 314 may manually override choices made of the "best" time column. This may be achieved by having User 314 input a configuration file into the Dataset Info table 306 through link 330.

The 2-step analysis above may be performed on initial putting into system production, then regularly thereafter, for example when the data center and cloud infrastructure which data pipelines are being monitored have a lighter operational activity. Table Analyser 301 may store data sequences in Data table 302, and corresponding metadata in Dataset Info table 306, with sequences that are temporary in nature, and that may not necessarily be used anymore in operational mode. The same transitory nature of data is with the breakpoint information stored in Breakpoint table 305.

Optionally, after having performed on a table the 2-step analysis above, the Table Analyser 301 may select portions of the table data, or "categories", so as to enable performing a monitoring of a subset of data only of an entire table. For example, assuming a table represents visits on a website, or actions taken on servers of a data center or cloud infrastructure, and data related to visits from a given country, or on a given area of the website go missing: this data could serve as a useful indication of failures to log actions on the part of very specific servers (ie: tightly associated with activities in a particular geography, or on a website), which yet could go unnoticed if the detection of anomaly (ie: missing data) were performed at a much larger superset of data, of which country data are only a small subset of a whole. For each table column other than a time column, the number of occurrences of each discrete value per time interval in the column may be calculated. For example, the number of occurrence of values such as "US", "France", "Germany", etc. may be calculated in a column related to geography. To be meaningful and selected, a category has to meet a double criteria of minimum total number of data (absolute, or relative to the total number of data in the data table or a column), and of spread of data over the time intervals. For example as regard the former criteria, only values with a minimum relative number of occurrences, for example 15% of the count of all values in the column, may be retained as selected categories, or the required minimum total number of data may be a % of the size of the source dataset, for example 1-5%, or a minimum average of data points per time interval may be required (for example 30). For example as regard the latter criteria a minimum number of data points may be required per time interval (for example 5), or a minimum of 95% of time intervals having non-null data, or data above a certain value, may be made a requirement. A table is always analysed as a whole, before considering filtering on a category. A category may be the result of aggregation of data from different columns of a table.

The output of the Table Analyser 301 may be a list of tuples such as: (dataset identification, time interval, count of lines) stored in the Data table 302 through link 324. For example, the output stored in Data table 302 may be as in Table 1 (assuming 113 as being the current time):

TABLE 1

Data table 302 illustrative content

| Dataset identification | Time interval | Count of lines |
|---|---|---|
| ... | ... | ... |
| 0 | 110 | 23 |
| 0 | 111 | 23 |
| 0 | 112 | 28 |
| ... | ... | ... |
| 1 | 110 | 105 |
| 1 | 111 | 112 |
| 1 | 112 | 102 |
| ... | ... | ... |
| 6 | 110 | 10598 |
| 6 | 111 | 10102 |
| 6 | 112 | 11566 |
| ... | ... | ... |

Conversely, Table Analyser 301 may store a list of tuples such as: (dataset identification, table identification, time column, category column, category) in the Dataset Info table 306 through link 322. For example, the output stored in Dataset Info table 306 may be as in Table 2:

TABLE 2

Dataset Info table 306 illustrative content

| Dataset identification | Table identification | Time column | Category column | Category |
|---|---|---|---|---|
| 0 | 0 | Creation_date | n/a | n/a |
| 1 | 0 | Creation_date | Country | US |
| 2 | 0 | Creation_date | Country | FR |
| 3 | 0 | Creation_date | Country | DE |
| 4 | 0 | Creation_date | Product | Server |
| 5 | 0 | Creation_date | Product | AI |
| 6 | 1 | Timestamp | n/a | n/a |
| ... | ... | ... | ... | ... |

In this illustrative content, "n/a" in the "Category column" indicates a dataset with all data from the table. Otherwise a category indication (ex: "Country") is for a dataset for a portion only of all data from the table, with an indication of which portion (ex: "US" for US-related portion of the data).

Breakpoint Finder 304 feeds the Breakpoint table 305 a list of tuples such as (dataset identification, breakpoint time interval) in the Breakpoint table 305 through link 327. For example, the output stored in Breakpoint table 305 may be as in Table 3:

TABLE 3

Breakpoint table 305 illustrative content

| Dataset identification | Breakpoint time interval |
|---|---|
| 0 | 87 |
| 1 | 27 |
| 2 | 102 |
| ... | ... |

We will now detail how Breakpoint Finder 304 may, with the assistance of the Trainer 303, analyse a sequence of points, generally, and particularly a truncated sequence at the request of the Table Analyser 301 when trying to determine a best time column in a table of data, and determine a predictive model for that sequence of points, including a best breakpoint for that sequence. "Best" from the perspective of a breakpoint, is the time interval in the sequence at which the predictive model returned by the Trainer 303, as will be detailed below, and using that time interval as a hypothetical breakpoint, returns a minimal discrepancy between certain predicted and actual data values.

Upon receiving a sequence of M points, Breakpoint Finder 304 may iterate over N (N<M) time intervals in the sequence, and for each time interval J among the N: (i) request Trainer 303 to calculate a regression, for example a linear regression, as will be detailed below, using that time interval J as a hypothetical breakpoint, (ii) calculate the discrepancy between certain predicted and actual data values, ie the error generated by the regression over the last K points in the sequence, with K being less than (M-J) since the error before the breakpoint is mostly irrelevant, (iii) select the time interval J closest to the end of the sequence which yields an error that is within a predetermined limit L, and (iv) return results for the sequence of points under the form of a predictive model to the Table Analyzer 301 and a "best" breakpoint value for that sequence in the Breakpoint Table 305.

More particularly:
- the number M has to be large enough so that the sequence may span over a time period that encompasses at least all the seasonal events that the predictive model aims at taking into consideration for the future. For example, with a time interval of a day, a sequence with M=560 points as exemplified above allows to account for the Summer period of the previous year;
- the number N has to be large enough, and the granularity between time intervals J low enough, so as to refine the search for the "best" breakpoint. As is known, N may be guided by the aim of a trade-off between accuracy and the computing power consumed by a large number of calculations. At one extreme, N may be equal to M, ie each and every time interval J in the sequence is being tested as a potential "best" breakpoint. At the other extreme, N may be equal to a fraction of M. Further, the N time intervals may be picked evenly across the entirety of the sequence as hypothetical breakpoints, for example time intervals J may be one in every five time intervals of the whole sequence. Alternatively, the N time intervals may be picked only in one part of the sequence, for example time intervals J may be located in the last half (most recent period) only of the whole sequence;
- K may be a limited (relative to the total number of points in the sequence) number of last points, for example last ten points in the sequence (eg: 10 days in a daily sequence of 560 points as shown above).

The error limit L may be determined as follows. For each time interval J being tested as a potential "best" breakpoint, the difference may be measured between predicted and actual data for each of the last K points in the sequence, and a sum of the squares of such differences may be calculated. This provides for a positive and absolute measure of the error. As is known, other means of error measuring may be used. A graph such as illustrated FIG. 4 may be drawn, of the error as a function of the time intervals $J_i$ being tested. For example, the sequence may have M=82 points, ie time intervals may be represented as ranging from 0 to 81. N=24 time intervals J may be tested as breakpoint, every 3 time intervals starting with time interval 2. K=8 last points in the sequence may be used to calculate the error. The error limit L may be picked as one that represents a compromise between intersecting with the error curve at a value as close as possible to the minimum error 401 for all $J_i$, and a value for which the last $J_i$ yielding an error below the limit L, is as close as possible to the time interval 81 (ie as recent as possible). For example, the value of L may be determined as a maximum % of, and above, the minimum error 401. For example on FIG. 4, $J_7$ may be considered the time interval yielding the "best" breakpoint.

The best breakpoint calculation by the Breakpoint Finder 304 may be performed not only during the 2-step analysis above toward determining the best time column in a data table, but also after that analysis when data tables are being updated.

We will now detail how Trainer 303 may analyse a sequence of points. Trainer 303 may be fed with such sequence and a breakpoint value (either as a true breakpoint for the sequence, or as a hypothetical one). One of the dimensions of these points may be the time interval. The other dimension may be a count of data lines in a table per time interval. An actual sequence of points is illustrated FIG. 5. Actual points 501 represent a number of records in a data table over time intervals from 0 to 540. With a time interval of one day for example, the sequence of points thus spans close to two years of data. Line 502 may be a breakpoint for the sequence at time interval 500, and line 503 may be a limit between a truncated and a full sequence of data. A particular drop in the point values 504 may be spotted: spanning nearly 2 months, it turns out to be associated with Summer months, when the count of data lines is significantly lower for the table associated with a particular activity that is reduced during that time season. The discrete point values around the beginning of the sequence and breakpoint 502 may be as indicated in column 2 of Table 4 below, in relation to (column 1) time intervals 0-8 and 490-509:

TABLE 4

| 1 time interval | 2 actual point value | 3 index_1 | 4 intercept_1 | 5 index_2 | 6 intercept_2 | 7 feature 1: summer | 8 feature 2: first_of_month | 9 feature 3: week-end | 10 predicted point value |
|---|---|---|---|---|---|---|---|---|---|
| 0 | 301.16 | 0.0 | 1.0 | 0.0 | 0.0 | 0.0 | 0.0 | 0.0 | 307.5616 |
| 1 | 601.16 | 1.0 | 1.0 | 0.0 | 0.0 | 0.0 | 1.0 | 0.0 | 636.5117 |
| 2 | 302.05 | 2.0 | 1.0 | 0.0 | 0.0 | 0.0 | 0.0 | 0.0 | 308.1070 |
| 3 | 305.39 | 3.0 | 1.0 | 0.0 | 0.0 | 0.0 | 0.0 | 0.0 | 308.3797 |
| 4 | 301.25 | 4.0 | 1.0 | 0.0 | 0.0 | 0.0 | 0.0 | 0.0 | 308.6525 |
| 5 | 183.19 | 5.0 | 1.0 | 0.0 | 0.0 | 0.0 | 0.0 | 1.0 | 155.9876 |
| 6 | 181.08 | 6.0 | 1.0 | 0.0 | 0.0 | 0.0 | 0.0 | 1.0 | 156.2604 |
| 7 | 305.69 | 7.0 | 1.0 | 0.0 | 0.0 | 0.0 | 0.0 | 0.0 | 309.4706 |
| 8 | 302.63 | 8.0 | 1.0 | 0.0 | 0.0 | 0.0 | 0.0 | 0.0 | 309.7433 |
| ... | ... | ... | ... | ... | ... | ... | ... | ... | ... |

TABLE 4-continued

| 1<br>time<br>interval | 2<br>actual<br>point<br>value | 3<br>index_1 | 4<br>intercept_1 | 5<br>index_2 | 6<br>intercept_2 | 7<br>feature 1:<br>summer | 8<br>feature 2:<br>first_of_month | 9<br>feature 3:<br>week-end | 10<br>predicted<br>point<br>value |
|---|---|---|---|---|---|---|---|---|---|
| 490 | 444.27 | 490.0 | 1.0 | 0.0 | 0.0 | 0.0 | 0.0 | 0.0 | 441.1956 |
| 491 | 451.19 | 491.0 | 1.0 | 0.0 | 0.0 | 0.0 | 0.0 | 0.0 | 441.4683 |
| 492 | 450.03 | 492.0 | 1.0 | 0.0 | 0.0 | 0.0 | 0.0 | 0.0 | 441.7410 |
| 493 | 451.74 | 493.0 | 1.0 | 0.0 | 0.0 | 0.0 | 0.0 | 0.0 | 442.0138 |
| 494 | 447.98 | 494.0 | 1.0 | 0.0 | 0.0 | 0.0 | 0.0 | 0.0 | 442.2865 |
| 495 | 269.40 | 495.0 | 1.0 | 0.0 | 0.0 | 0.0 | 0.0 | 1.0 | 289.6217 |
| 496 | 271.41 | 496.0 | 1.0 | 0.0 | 0.0 | 0.0 | 0.0 | 1.0 | 289.8944 |
| 497 | 451.68 | 497.0 | 1.0 | 0.0 | 0.0 | 0.0 | 0.0 | 0.0 | 443.1047 |
| 498 | 444.24 | 498.0 | 1.0 | 0.0 | 0.0 | 0.0 | 0.0 | 0.0 | 443.3774 |
| 499 | 452.17 | 499.0 | 1.0 | 0.0 | 0.0 | 0.0 | 0.0 | 0.0 | 443.6501 |
| 500 | 450.05 | 0.0 | 0.0 | 0.0 | 1.0 | 0.0 | 0.0 | 0.0 | 447.4252 |
| 501 | 450.13 | 0.0 | 0.0 | 1.0 | 1.0 | 0.0 | 0.0 | 0.0 | 446.8981 |
| 502 | 268.05 | 0.0 | 0.0 | 2.0 | 1.0 | 0.0 | 0.0 | 1.0 | 293.4335 |
| 503 | 270.84 | 0.0 | 0.0 | 3.0 | 1.0 | 0.0 | 0.0 | 1.0 | 292.9064 |
| 504 | 447.49 | 0.0 | 0.0 | 4.0 | 1.0 | 0.0 | 0.0 | 0.0 | 445.3168 |
| 505 | 452.79 | 0.0 | 0.0 | 5.0 | 1.0 | 0.0 | 0.0 | 0.0 | 444.7897 |
| 506 | 448.19 | 0.0 | 0.0 | 6.0 | 1.0 | 0.0 | 0.0 | 0.0 | 444.2627 |
| 507 | 445.18 | 0.0 | 0.0 | 7.0 | 1.0 | 0.0 | 0.0 | 0.0 | 443.7356 |
| 508 | 448.74 | 0.0 | 0.0 | 8.0 | 1.0 | 0.0 | 0.0 | 0.0 | 443.2085 |
| 509 | 267.11 | 0.0 | 0.0 | 9.0 | 1.0 | 0.0 | 0.0 | 1.0 | 289.7439 |
| ... | ... | ... | ... | ... | ... | ... | ... | ... | ... |

The Trainer 303 may return a predictive model for the sequence composed of a regression of the point values, with two slopes: a first slope before the breakpoint value 502, and a second slope after the breakpoint value 502. The regression may be a simple linear regression, or such other known regression method. The regression may be calculated on a sample only of the points of the sequence, in order to, as is known, limit computing resources consumed by the Trainer 303. Such regression may be affected by parameters or coefficients as follows:

times features, such as those found in columns 7-9 in Table 4 above, may be generated by Trainer 303, based on feature information collected from Feature table 307. Feature information may be related to particular events, whether seasonal (such as holiday periods, season of the year, fiscal quarter, other regular events, etc.) or exceptional (such as weather, a particular event affecting a company, failures and incidents in a data center, power cuts, etc.). Feature information may be collected as is known from the web, or from private company sources, or entered manually into Feature table 307. These time features may for example take the form, as shown in Table 4 above, of a "1" set for the corresponding time interval when the feature information is "true", of a "0" otherwise. For example, the first of the month and the week-end days may be spotted as "1"s in columns 8 and 9 of Table 4 above. These binary values may instead be integer or real values. Features may also be entered by the User 314 through link 329 into Feature table 307. This may for example be the case for events that are unpredictable in nature, such as a particular known failure of an element (ex: a server, a networking device etc.) of a monitored data center or a cloud infrastructure, or the exact date of which may be insider information, such as the launch of a marketing campaign by the entity operating or using the monitored data center or cloud infrastructure.

indexes, such as those found in columns 3 and 5 in Table 4 above, may be generated by Trainer 303, to reflect the pre- or post-breakpoint 502 time interval handling. For example, Index_1 (column 3) may have a value incremented from "0" for time interval 0, to "499" for time interval 499, then set to "0" starting with the time interval 500 for the breakpoint 502. Index_2 (column 5) may have a value set to "0" until time interval 499, then incremented from "0" for time interval 500, to a value equal to (time interval value−500).

intercepts, such as those found in columns 4 and 6 in Table 4 above, may be generated by Trainer 303, to further reflect the pre- or post-breakpoint 502 time interval handling. Intercept_1 (column 4) may be set to "1" until time interval 499, then set to "0" starting at time interval 500 for the breakpoint 502. Intercept_2 (column 6) may be set to "0" until time interval 499, then set to "1" starting at time interval 500 for the breakpoint 502.

A regression such as a linear regression may be generated using the time features, index_1, index_2, intercept_1 and intercept_2, that is capable of predicting a point value at any time interval. As is known, assuming a general case of Q time features, each point as a function of time interval t may be expressed under the form of a vector:

$$x_t = (\text{intercept}_{1,t}; \text{index}_{1,t}; \text{intercept}_{2,t}; \text{index}_{2,t}; f_{1,t}; f_{2,t}; \ldots; f_{Q,t})$$

and such linear regression may be expressed as:

$$\hat{y}_t = \sum_i x_{t,i} \cdot w_i$$

where $w_i$ are respective weights and $\hat{y}_t$ the predicted value at time interval t.

As is know, this is merely an example, and other parameters or coefficients may be chosen for the regression, as well as down sampling the number of points in, a sequence on which a training is performed, still within the teachings of the present disclosure.

Figure 5:
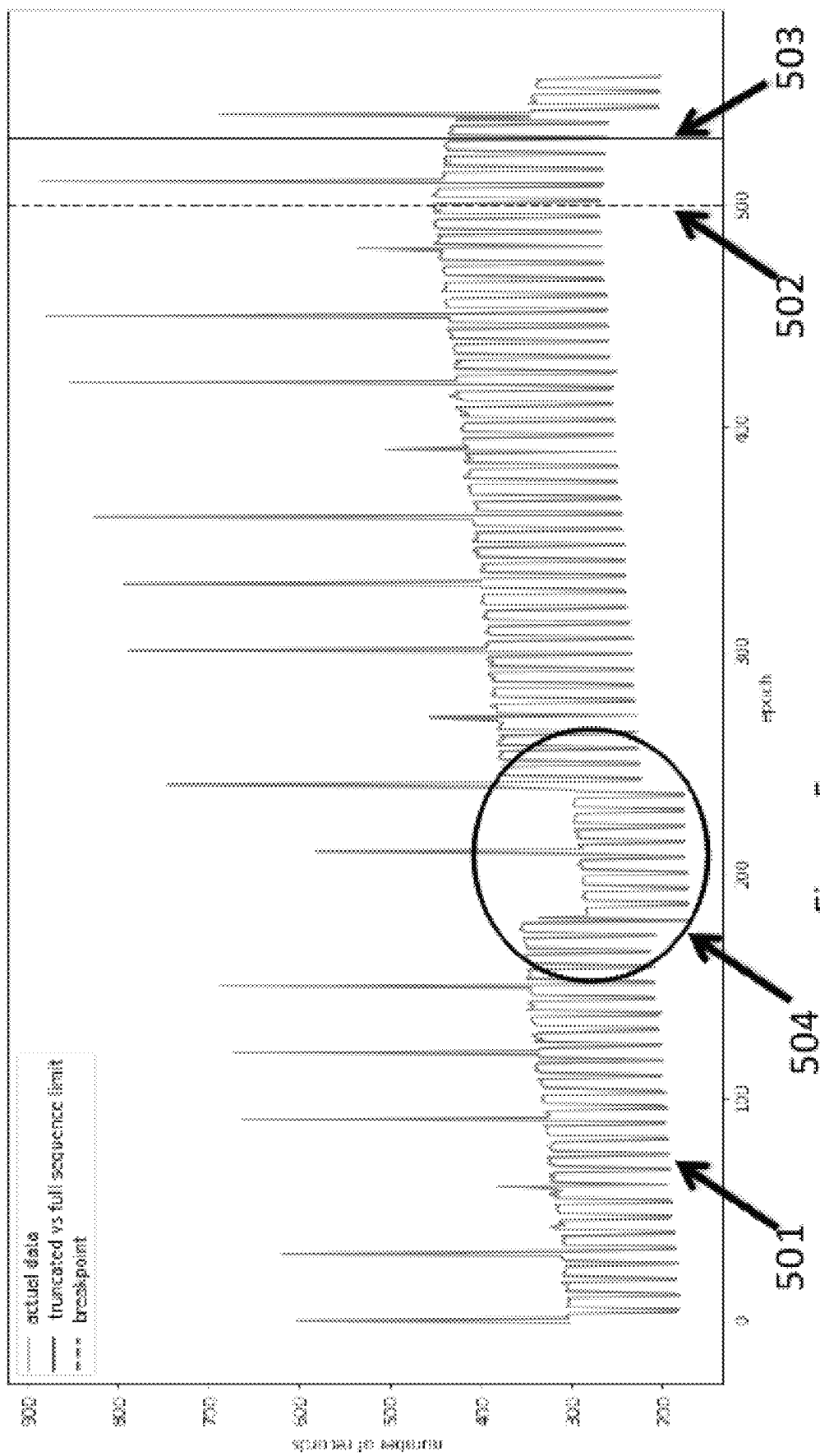
FIG. 5 illustrates an actual sequence of points.
Figure 6A:
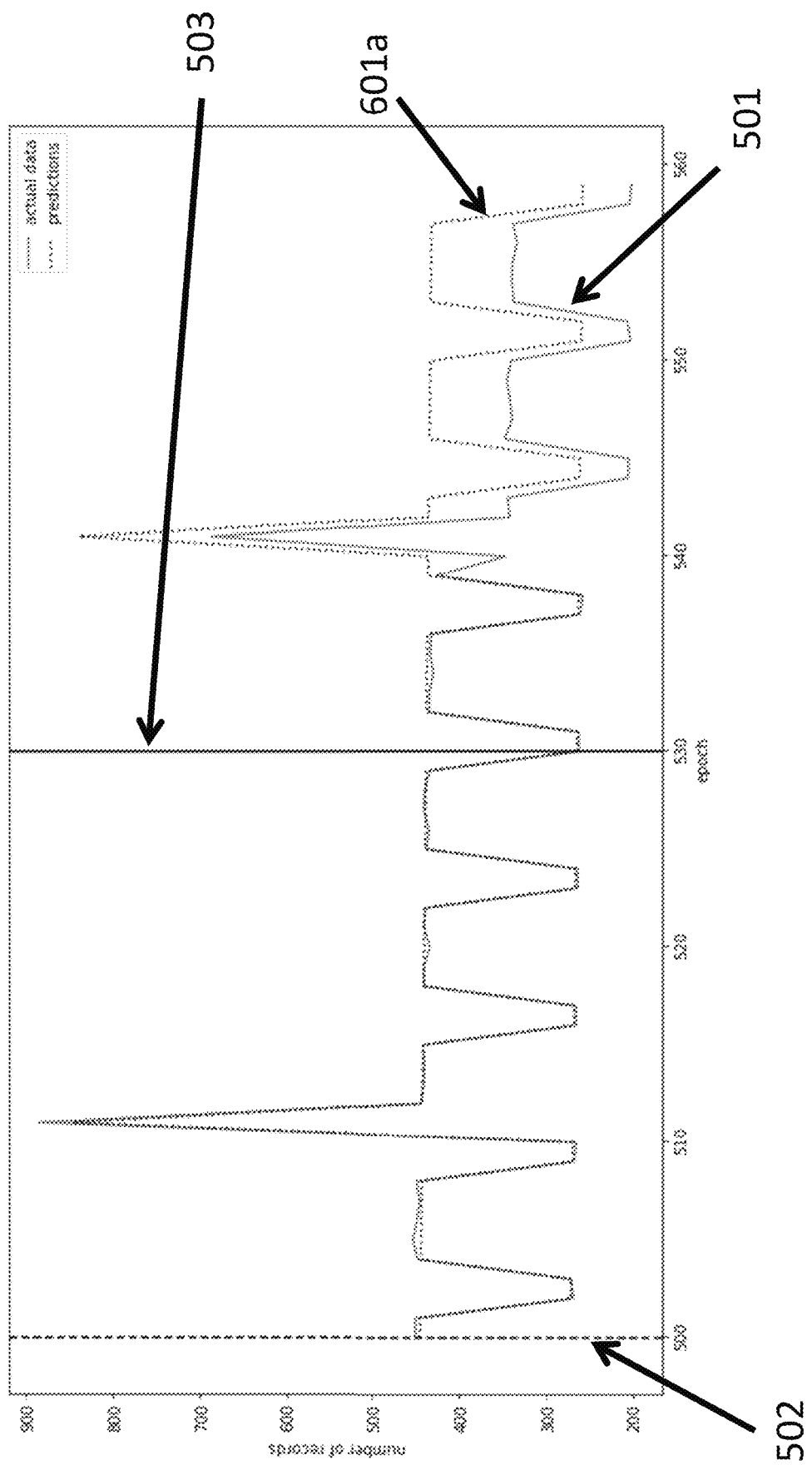
FIGS. 6a-6b show enlarged views of the sequence of FIG. 5 to illustrate the influence of the presence or not of a time feature over the predicted data vs actual data.
Figure 6B:
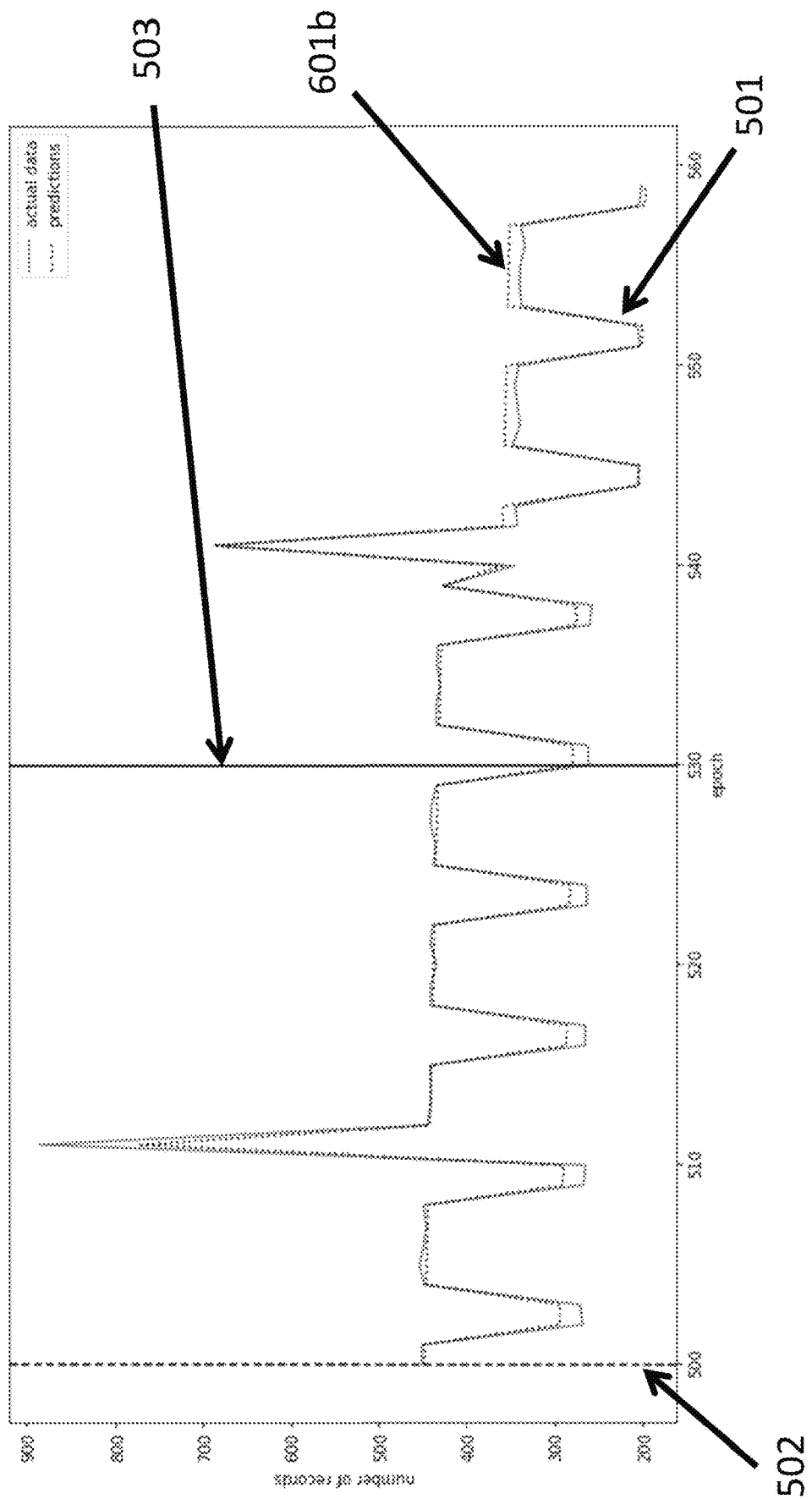

FIG. 6a-6b show an enlarged view of the sequence of FIG. 5 around time intervals 500-560, ie after the breakpoint 502. This view illustrates the impact of the time features generated by Trainer 303 on the ability of the regression to accurately predict point values after line 503, as a limit between a truncated (on which the linear regression is calculated) and a full sequence of data (including actual data, and data as predicted by the linear regression). On FIG. 6a, the time feature 1 ("Summer") is omitted, ie a seasonal effect (the drop in the point values 504) that affected point values before the breakpoint 502, is not taken into consideration by the regression after the breakpoint, even though the second slope (downward) is noticeable. Predicted data 601a are clearly off by a large amount compared to actual data 501. This is because, shortly after the breakpoint 502, Summer months occur that are not taken into consideration by the predictive model. On the contrary, on FIG. 6b, the time feature 1 ("Summer") is included. Predicted data 601b fit much more closely actual data 501.

FIG. 3b depicts components of the present technology, and the interactions between them in an anomaly detection functionality configuration. Components that are identical to those found in FIG. 3a have the same capabilities. The other components are as follows:

A Table Aggregator 315: may access metadata about sequences in the Dataset Info table 306 through link 331, and use them to make queries to the Reader 202, and access to data provided by it through link 340. Table Aggregator 315 may then update the Data table 302 through link 332 with any new data in sequences.

The Trainer 303 may be provided a breakpoint by Breakpoint table 305 through link 333, as necessary when it has a sequence to analyze.

An Anomaly Detector 311: may request of the Trainer 303 through link 334, to train over a sequence of data and return to it data predictive models through link 334. It may further read sequences of data through link 335 from Data table 302, and metadata about such sequences through link 336 from Dataset Info table 306. It may further feed a Prediction table 312 through link 337.

A Dashboard 313: may obtain predictions from Prediction table 312 through link 338. It may further display to the User 314 predictions and deviations thereof through known display means depicted as link 339.

The User 314: may still input or override metadata in the Dataset Info table 306 and data in the Feature table 307 as in FIG. 3a. Even though represented as the same for convenience, it may be two different users between FIGS. 3a and 3b.

The Breakpoint Finder 304: may still calculate and store breakpoint information about sequences of data as in FIG. 3a.

A functional description of the above components and their interaction will now be provided. The Anomaly Detector 311 may be run to, for example, permanently monitor the health of a data center or cloud infrastructure by constantly monitoring its data pipelines. Alternatively, the Anomaly Detector 311 may be run "periodically" (ie: every so many time intervals) or "on-request".

The update of a table in Data table 302 may involve: increment of at least one time interval with the corresponding count of data lines in the table for the time interval, and, as the case may be, updates to counts of data lines for time intervals before the last. Table Aggregator 315 may obtain from the reader 202 updated data tables, form sequences of points based thereon, and store these sequences in Data table 302 as a substitute for the sequences of points formed from the previous version of the data tables. As is known, the "substitution", for sparing computing resources, may involve merely adding points for new time intervals, and updating modified counts of data lines for up to a limited number of time intervals before the last.

During the anomaly detection functionality, the calculation by Breakpoint Finder 304 of a best breakpoint may be renewed periodically and/or constantly, as a background task in the system, to handle updated data tables. The calculation may be performed at each incremented time interval, or at spaced apart incremented time intervals, on all datasets in all tables, or on certain alternating datasets or tables only. The more frequent the breakpoint calculation is relative to a table, the more the system is capable of precision and accurately taking into account a change of trend in table data. The frequency however of running a breakpoint calculation is a trade-off with the burden to the whole system of the computing power and resource consumption required by the Breakpoint Finder 304. After each breakpoint calculation, Breakpoint Finder 304 feeds the Breakpoint table 305 with updated breakpoint information for the data table involved.

When in function, the Anomaly Detector 311 may (i) collect a first sequence of points from Data table 302, (ii) request the Trainer 303 to train over the first sequence and return a predictive model for it (ie: a first regression, such as a linear regression), (iii) calculate the discrepancy between all predicted and actual data values, ie an absolute value of the error generated by the first regression for each point in the sequence, creating a second sequence (of predicted errors), (iv) request the Trainer 303 to train over the second sequence and return a predictive model for it (ie: a second regression such as a linear regression), (v) calculate a confidence interval for a selection of points with a time interval, for example immediately preceding the last time interval in the first sequence with a center as the predicted value (ie: by the first regression), and the upper and lower limits determined by a factor of X times (+/−) the absolute value of predicted error at that point (ie: by the second regression), and (vi) raise an alert, depending on the factor X, when, for any point in such selection, the actual value lies outside the confidence interval.

More particularly:

the factor X may for example be 2, 3, or 5. The type of alert raised by the Anomaly Detector 311 may differ depending on the value of factor X for which an actual point value is outside the confidence interval. For example, a critical alert may be raised when the actual value is outside a confidence interval calculated with a factor X of 5, and a warning only may be raised when the actual value is outside a confidence interval calculated with a factor X of 2. Other factor values and levels of alert may be adopted still within the teachings of the present disclosure;

the Anomaly Detector 311 may store a list of tuples such as: (dataset identification, time interval, actual count of lines, predicted count of lines, predicted error, anomaly type) in the Prediction table 312. For example, the output stored in Prediction table 312 may be as in Table 5:

TABLE 5

Prediction table 312 illustrative content

| Dataset identification | Time interval | Actual Count of lines | Predicted count of lines | Predicted error | Anomaly type |
|---|---|---|---|---|---|
| ... | ... | ... | ... | ... | ... |
| 0 | 110 | 23 | 24 | 1.2 | OK |
| 0 | 111 | 23 | 26 | 1.2 | Warning_UP |
| 0 | 112 | 28 | 33 | 0.8 | Critical_UP |

TABLE 5-continued

Prediction table 312 illustrative content

| Dataset identification | Time interval | Actual Count of lines | Predicted count of lines | Pre- dicted error | Anomaly type |
|---|---|---|---|---|---|
| ... | ... | ... | ... | ... | ... |
| 1 | 110 | 105 | 94 | 3.4 | Anomaly_DOWN |
| 1 | 111 | 112 | 103 | 3.4 | Warning_DOWN |
| 1 | 112 | 102 | 106 | 3.4 | OK |
| ... | ... | ... | ... | ... | ... |

In the example of Table 5: a Warning_(UP or DOWN) may be raised if the discrepancy between actual and predicted line count is more than 2× the Accepted deviation, an Anomaly_(UP or DOWN) may be raised if the discrepancy between actual and predicted line count is more than 3× the Accepted deviation, and a Critical_(UP or DOWN) may be raised if the discrepancy between actual and predicted line count is more than 5× the Accepted deviation. Otherwise the discrepancy is tagged "OK";

the data in Prediction table 312 may be presented to the User 314 under the form of the content of Dashboard 313, allowing as is known, User 314 to conveniently read, interpret and analyze data.

In one aspect of the present technology, the Anomaly Detector 311 may be run to analyze the most recent past, for example the last few time intervals in a sequence of points in a data pipeline. For example the last 3 time intervals, but other durations may be adopted still within the teachings of the present disclosure.

Regardless of that duration, the Anomaly Detector 311 may be run at each new time interval, for example every day if the system time interval is a day, or less frequently, as a trade-off between the computing power required to operate the system according to the present technology, and the requirement to raise monitoring alerts quickly depending on the part of the monitored data center of cloud infrastructure.

It will be apparent to the person skilled in the art that different instances of the system of the present technology may be run in parallel, so as to, for example, monitor different parts of a data center or cloud infrastructure, and/or as the case may be, be run at different times or periodicities, and/or have a different time intervals as the system "clock unit" (for example, in one instance datasets may be aggregated at a time interval of one day, while in another instance, the same of different datasets may be aggregated at a time interval of one hour).

It will also be apparent to the person skilled in the art that while largely presented above in relation to monitoring data pipelines of a data center or cloud infrastructure, the teachings herein may be applied to pipelines of data produced by other systems to be monitored for possible anomalies.

Figure 7:
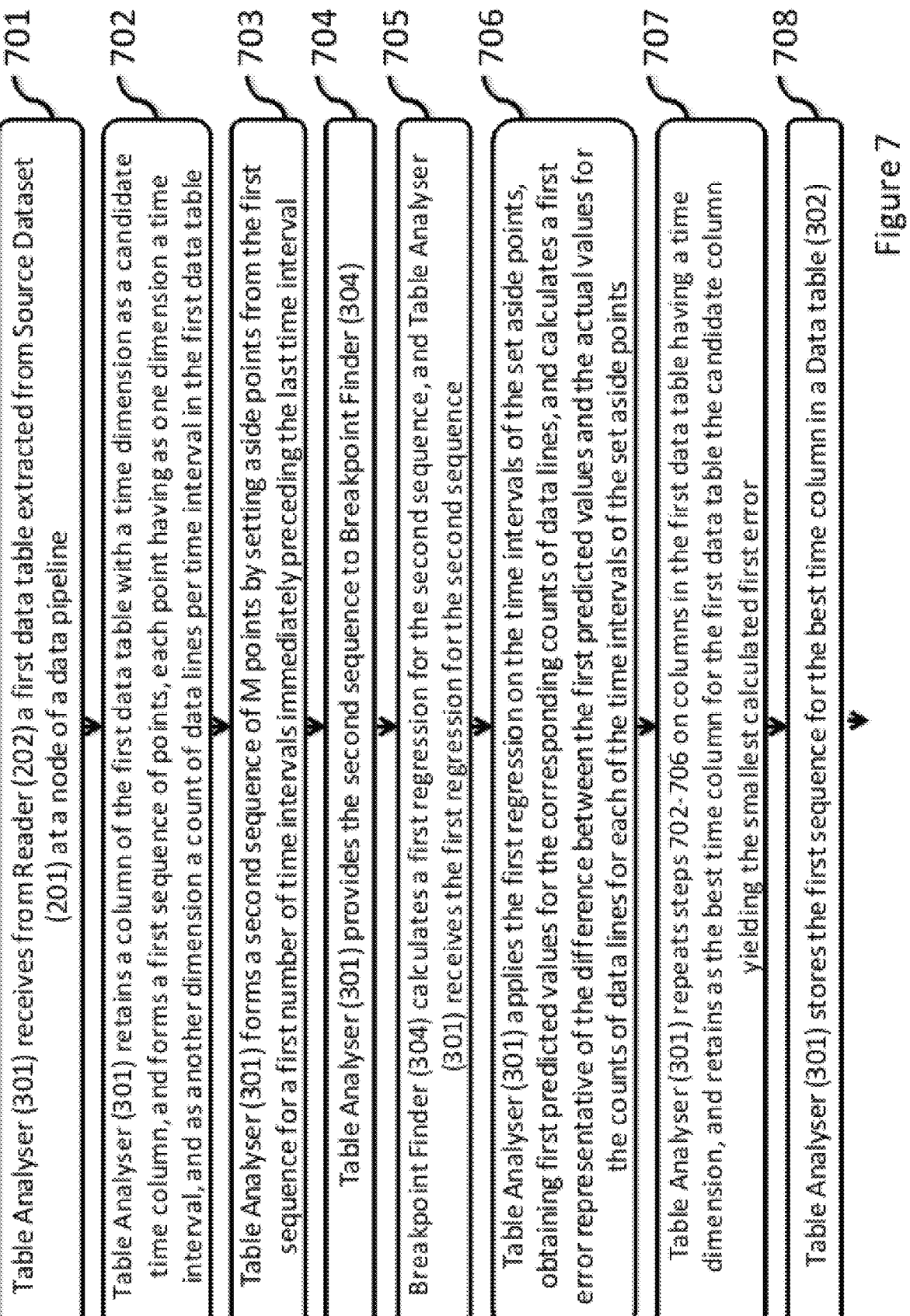
FIG. 7 depicts method steps in one embodiment of a table analysis functionality.

FIG. 7 depicts method steps in one embodiment of a table analysis functionality. At step 701, Table Analyser (301) receives from Reader (202) a first data table extracted from Source Dataset (201) at a node of a data pipeline. At step 702, Table Analyser (301) retains a column of the first data table with a time dimension as a candidate time column, and forms a first sequence of points, each point having as one dimension a time interval, and as another dimension a count of data lines per time interval in the first data table. At step 703, Table Analyser (301) forms a second sequence of M points by setting aside points from the first sequence for a first number of time intervals immediately preceding the last time interval. At step 704, Table Analyser (301) provides the second sequence to Breakpoint Finder (304). At step 705, Breakpoint Finder (304) calculates a first regression for the second sequence, and Table Analyser (301) receives the first regression for the second sequence. At step 706, Table Analyser (301) applies the first regression on the time intervals of the set aside points, obtaining first predicted values for the corresponding counts of data lines, and calculates a first error representative of the difference between the first predicted values and the actual values for the counts of data lines for each of the time intervals of the set aside points. At step 707, Table Analyser (301) repeats steps 702-706 on columns in the first data table having a time dimension, and retains as the best time column for the first data table the candidate column yielding the smallest calculated first error. At step 708, Table Analyser (301) stores the first sequence for the best time column in a Data table (302).

Figure 8:
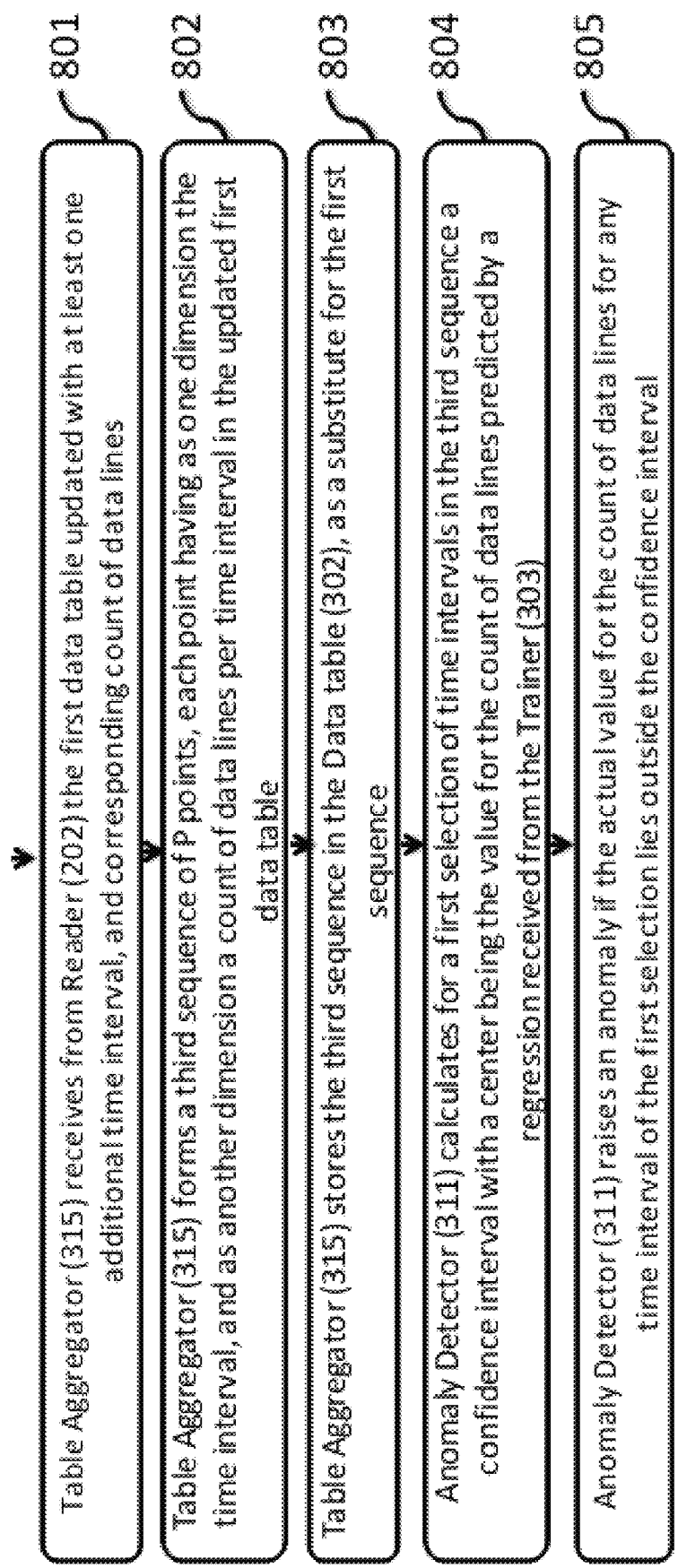
FIG. 8 depicts method steps in one embodiment of an anomaly detection functionality.

FIG. 8 depicts method steps in one embodiment of an anomaly detection functionality. Once the best time column has been determined and stored for the first data table, at step 801, Table Aggregator (315) receives from Reader (202) the first data table updated with at least one additional time interval, and corresponding count of data lines. At step 802, Table Aggregator (315) forms a third sequence of P points, each point having as one dimension the time interval, and as another dimension a count of data lines per time interval in the updated first data table. At step 803, Table Aggregator (315) stores the third sequence in the Data table (302), as a substitute for the first sequence. At step 804, Anomaly Detector (311) calculates for a first selection of time intervals in the third sequence a confidence interval with a center being the value for the count of data lines predicted by a regression received from the Trainer (303). At step 805, Anomaly Detector (311) raises an anomaly if the actual value for the count of data lines for any time interval of the first selection lies outside the confidence interval.

Figure 9:
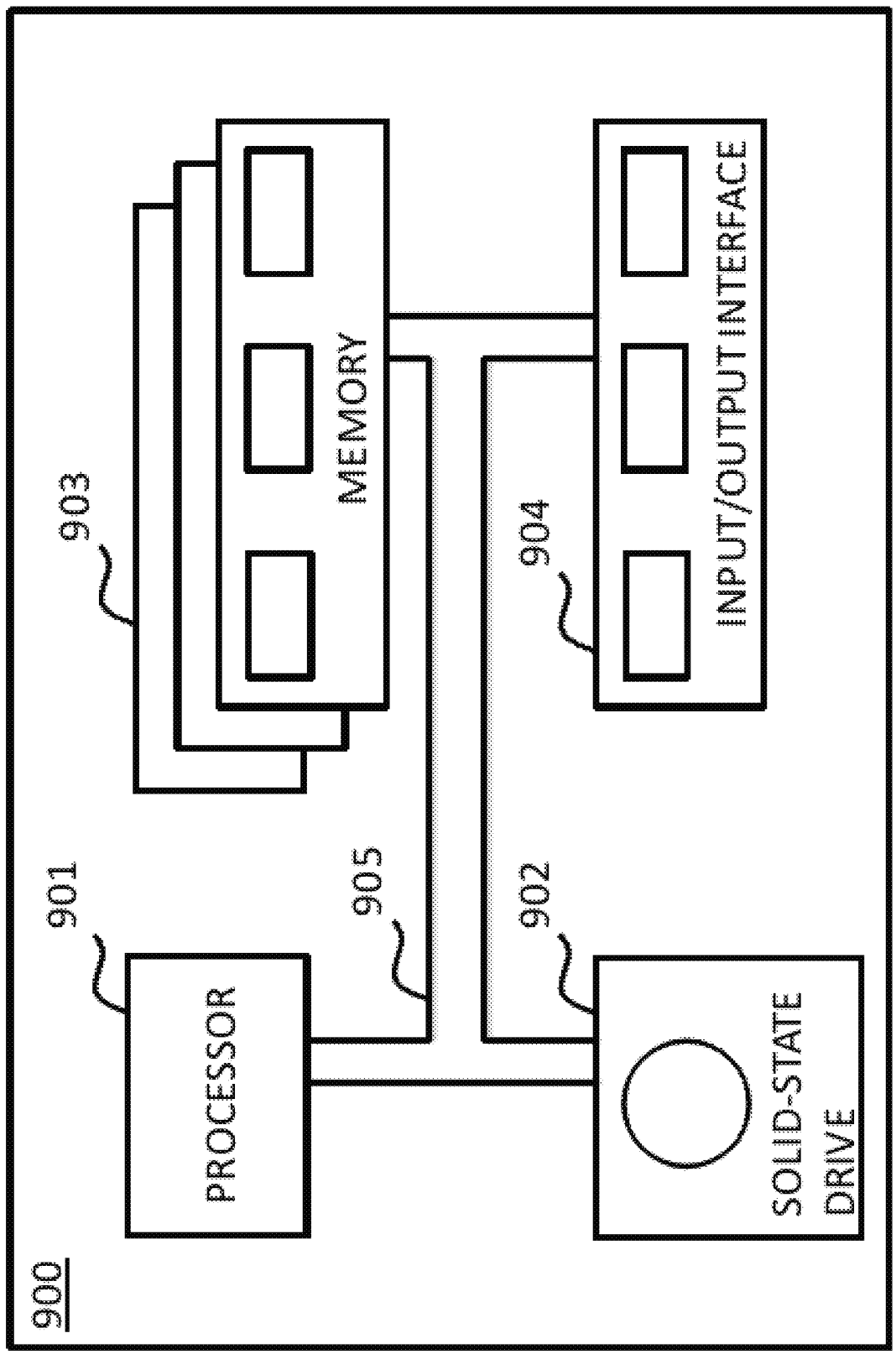
FIG. 9 depicts a computing system that may be used to implement the methods and processes according to the present technology.

The method and process steps described above may be implemented in a computing system, of which an example, without limitation, may be found in relation to FIG. 9. As will be appreciated by the person skilled in the art, such computing system may be implemented in any other suitable hardware, software, and/or firmware, or a combination thereof, and may be a single physical entity, or several separate physical entities with a distributed functionality.

In some aspects of the present technology, the computing system 900 may comprise various hardware components including one or more single or multi-core processors collectively represented by a processor 901, a solid-state drive 902, a memory 903 and an input/output interface 904. In this context, the processor 901 may or may not be included in a FPGA. In some other aspects, the computing system 900 may be an "off the shelf" generic computing system. In some aspects, the computing system 900 may also be distributed amongst multiple systems. The computing system 900 may also be specifically dedicated to the implementation of the present technology. As a person in the art of the present technology may appreciate, multiple variations as to how the computing system 900 is implemented may be envisioned without departing from the scope of the present technology.

Communication between the various components of the computing system 900 may be enabled by one or more internal and/or external buses 905 (e.g. a PCI bus, universal serial bus, IEEE 1394 "Firewire" bus, SCSI bus, Serial-ATA bus, ARINC bus, etc.), to which the various hardware components are electronically coupled.

The input/output interface 904 may allow enabling networking capabilities such as wire or wireless access. As an example, the input/output interface 904 may comprise a networking interface such as, but not limited to, a network port, a network socket, a network interface controller and the like. Multiple examples of how the networking interface may be implemented will become apparent to the person skilled in the art of the present technology. According to implementations of the present technology, the solid-state drive 902 may store program instructions, such as those part of, for example, a library, an application, etc. suitable for being loaded into the memory 903 and executed by the processor 901 for the method and process steps according to the present technology.

While the above-described implementations have been described and shown with reference to particular steps performed in a particular order, it will be understood that these steps may be combined, sub-divided, or re-ordered without departing from the teachings of the present disclosure. At least some of the steps may be executed in parallel or in series. Accordingly, the order and grouping of the steps is not a limitation of the present technology. It should further be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for detecting anomalies in a data pipeline, wherein a Reader extracts data tables from a Source Dataset at a node of the data pipeline, the method comprising:
   receiving, by a Table Analyser from the Reader, a first data table;
   retaining, by the Table Analyser, a column of the first data table with a time dimension as a candidate time column, and forming a first sequence of points, each point having as one dimension a time interval, and as another dimension a count of data lines per time interval in the first data table;
   forming, by the Table Analyser, a second sequence of M points by setting aside points from the first sequence for a first number of time intervals immediately preceding a last time interval;
   providing, by the Table Analyser, the second sequence to a Breakpoint Finder;
   calculating, by the Breakpoint Finder, a first regression for the second sequence, and receiving by the Table Analyser, the first regression for the second sequence;
   applying, by the Table Analyser, the first regression on the time intervals of the set aside points, obtaining first predicted values for corresponding counts of data lines, and calculating a first error representative of a difference between the first predicted values and actual values for the counts of data lines for each of the time intervals of the set aside points;
   repeating, by the Table Analyser, the retaining, forming, providing, receiving and applying, on columns in the first data table having a time dimension, and retaining as a best time column, the first data table candidate column yielding a smallest calculated first error;
   storing, by the Table Analyser, the first sequence for the best time column in a Data table;
   receiving, by a Table Aggregator from the Reader, the first data table updated with at least one additional time interval and corresponding count of data lines;
   forming, by the Table Aggregator, a third sequence of P points, each point having as one dimension the time interval, and as another dimension a count of data lines per time interval in the updated first data table;
   storing, by the Table Aggregator, the third sequence in the Data table, as a substitute for the first sequence;
   calculating, by an Anomaly Detector, for a first selection of time intervals in the third sequence a confidence interval with a center being the value for the count of data lines predicted by a regression received from a Trainer; and
   raising, by the Anomaly Detector, an anomaly alert if an actual value for the count of data lines for any time interval of the first selection lies outside the confidence interval.

2. The method of claim 1, wherein the calculating by an Anomaly Detector a confidence interval for a first selection of time intervals in the third sequence comprises:
   receiving from the Data table the third sequence;
   providing the third sequence to a Trainer;
   receiving from the Trainer a second regression for the third sequence;
   applying the second regression on all time intervals in the third sequence, and obtaining second predicted values for the corresponding counts of data lines for the time intervals of the first selection in the third sequence;
   calculating a second error representative of the difference between the second predicted values and the actual values for the counts of data lines for each of the time intervals of the first selection; and
   calculating, for each time interval of the first selection in the third sequence, a confidence interval with a center being the second predicted value, and bounded by plus or minus a first factor multiplied by the second error.

3. The method of claim 2, wherein the calculating by the Anomaly Detector the second error comprises:
   forming a fourth sequence of points, each point having as one dimension the time interval, and as another dimension an absolute value of the difference between the second predicted value and the actual value for the count of data lines for each of the time intervals of the first selection;
   providing the fourth sequence to the Trainer; and
   receiving from the Trainer a third regression for the fourth sequence;
   wherein the second error is, for each time interval of the first selection in the third sequence, the value predicted by the third regression for that time interval.

4. The method of claim 1, wherein the calculating by the Breakpoint Finder the first regression for the second sequence of M points comprises:
   retaining a time interval $M'_i$ of one of the points in the second sequence;
   providing to the Trainer the second sequence and $M'_i$ as a hypothetical breakpoint;
   calculating by the Trainer a fourth regression for the second sequence and $M'_i$ as a hypothetical breakpoint, and receiving the fourth regression for the second sequence;
   applying the fourth regression on M", M"<(M−M'), time intervals immediately preceding the last time interval for the points in the second sequence, obtaining fourth predicted values for the corresponding counts of data lines, and calculating a third error representative of the difference between the fourth predicted values and the actual values for the counts of data lines for each of M" time intervals for the points in the second sequence;

repeating the retaining, providing, calculating and applying for all time intervals M'$_i$, i∈[1, N], N<M, N being a selection of points in the second sequence;

retaining, as a best breakpoint for the second sequence, the time interval M'$_i$ closest to the last time interval in the second sequence and yielding a calculated third error below a predetermined value L, and the corresponding fourth regression as the first regression for the second sequence provided to the Table Analyser; and storing the best breakpoint for the second sequence in a Breakpoint table.

5. The method of claim 4, further comprising calculating by the Breakpoint Finder an updated best breakpoint for the updated first data table, comprising:

receiving the third sequence of P points from the Data table;

retaining a time interval P'$_i$ of one of the points in the third sequence;

providing to the Trainer the third sequence and P'$_i$ as a hypothetical breakpoint;

calculating by the Trainer a fifth regression for the third sequence and P'$_i$ as a hypothetical breakpoint, and receiving the fifth regression for the third sequence;

applying the fifth regression on P''', P'''<(P−P'), time intervals immediately preceding the last time interval for the points in the third sequence, obtaining fifth predicted values for the corresponding counts of data lines, and calculating a fourth error representative of the difference between the fifth predicted values and the actual values for the counts of data lines for each of P''' time intervals for the points in the third sequence;

repeating the retaining, providing, calculating and applying for all time intervals P'$_i$, i∈[1, Q], Q<P, Q being a selection of points in the third sequence;

retaining as a best breakpoint for the third sequence the time interval P'$_i$ closest to the last time interval in the third sequence and yielding a calculated fourth error below a predetermined value R; and storing the best breakpoint for the third sequence, in the Breakpoint table.

6. The method of claim 1, further comprising performing by the Table Analyser, after the retaining the best time column for the first data table:

selecting a column of the first table other than a column with a time dimension;

counting data lines per time interval for each of the values in the selected column;

retaining as a category each of the values for which the total count of data lines exceeds a predetermined number S, and the count of data lines per time interval exceeds a predetermined number T for at least a predetermined percentage U of the time intervals for the selected column;

forming a sequence of points for each category, each point having as one dimension the time interval and as another dimension the count of data lines per time interval for the value of the category; and storing the sequence for each category in the Data table.

7. A system for detecting anomalies in a data pipeline, comprising:

at least one processor, and at least one memory comprising executable instructions, wherein the at least one processor and the instructions cause the system to execute:

a Reader component configured to extract data tables from a Source Dataset at a node of the data pipeline;

a Table Analyser component configured to:

receive from the Reader component a first data table;

retain a column of the first data table with a time dimension as a candidate time column, and form a first sequence of points, each point having as one dimension a time interval, and as another dimension a count of data lines per time interval in the first data table;

form a second sequence of M points by setting aside points from the first sequence for a first number of time intervals immediately preceding a last time interval;

provide the second sequence to a Breakpoint Finder component configured to calculate a first regression for the second sequence;

receive the first regression for the second sequence;

apply the first regression on the time intervals of the set aside points, obtain first predicted values for corresponding counts of data lines, and calculate a first error representative of a difference between the first predicted values and actual values for the counts of data lines for each of the time intervals of the set aside points;

repeat the retaining, forming, providing, receiving and applying, on columns in the first data table having a time dimension, and retain as a best time column for the first data table a candidate column yielding a smallest calculated first error; and store the first sequence for the best time column in a Data table;

a Table Aggregator component configured to:

receive from the Reader component a first data table updated with at least one additional time interval and corresponding count of data lines;

form a third sequence of P points, each point having as one dimension the time interval, and as another dimension a count of data lines per time interval in the updated first data table;

store the third sequence in the Data table, as a substitute for the first sequence; and an Anomaly Detector component configured to:

calculate, for a first selection of time intervals in the third sequence, a confidence interval with a center being the value for the count of data lines predicted by a regression received from a Trainer component; and raise an anomaly alert if an actual value for the count of data lines for any time interval of the first selection lies outside the confidence interval.

8. The system of claim 7, wherein the Anomaly Detector component is further configured to calculate a confidence interval for a first selection of time intervals in the third sequence by:

receiving from the Data table the third sequence;

providing the third sequence to the Trainer component;

receiving from the Trainer component a second regression for the third sequence;

applying the second regression on all time intervals in the third sequence, and obtaining second predicted values for the corresponding counts of data lines for the time intervals of the first selection in the third sequence;

calculating a second error representative of the difference between the second predicted values and the actual values for the counts of data lines for each of the time intervals of the first selection; and calculating, for each time interval of the first selection in the third sequence, a confidence interval with a center being the second predicted value, and bounded by plus or minus a first factor multiplied by the second error.

9. The system of claim 8, wherein the Anomaly Detector component is further configured to calculate the second error by:
   forming a fourth sequence of points, each point having as one dimension the time interval, and as another dimension an absolute value of the difference between the second predicted value and the actual value for the count of data lines for each of the time intervals of the first selection;
   providing the fourth sequence to the Trainer component;
   receiving from the Trainer component a third regression for the fourth sequence; and
   adopting, as the second error for each time interval of the first selection in the third sequence, the value predicted by the third regression for that time interval.

10. The system of claim 7, wherein the Breakpoint Finder component is further configured to calculate a first regression for the second sequence of M points by:
   retaining a time interval $M'_i$ of one of the points in the second sequence;
   providing to the Trainer component the second sequence and $M'_i$ as a hypothetical breakpoint;
   calculating by the Trainer component a fourth regression for the second sequence and $M'_i$ as a hypothetical breakpoint, and receiving the fourth regression for the second sequence;
   applying the fourth regression on M", M"<(M−M'), time intervals immediately preceding the last time interval for the points in the second sequence, obtaining fourth predicted values for the corresponding counts of data lines, and calculating a third error representative of the difference between the fourth predicted values and the actual values for the counts of data lines for each of M" time intervals for the points in the second sequence;
   repeating the retaining, providing, calculating and applying for all time intervals $M'_i$, i∈[1, N], N<M, N being a selection of points in the second sequence;
   retaining, as a best breakpoint for the second sequence, the time interval $M'_i$ closest to the last time interval in the second sequence and yielding a calculated third error below a predetermined value L, and the corresponding fourth regression as the first regression for the second sequence provided to the Table Analyser component; and
   storing the best breakpoint for the second sequence in a Breakpoint table.

11. The system of claim 10, wherein the Breakpoint Finder component is further configured to calculate an updated best breakpoint for the updated first data table by:
   receiving the third sequence of P points from the Data table;
   retaining a time interval $P'_i$ of one of the points in the third sequence;
   providing to the Trainer component the third sequence and $P'_i$ as a hypothetical breakpoint;
   calculating by the Trainer component a fifth regression for the third sequence and $P'_i$ as a hypothetical breakpoint, and receiving the fifth regression for the third sequence;
   applying the fifth regression on P"', P"'<(P−P'), time intervals immediately preceding the last time interval for the points in the third sequence, obtaining fifth predicted values for the corresponding counts of data lines, and calculating a fourth error representative of the difference between the fifth predicted values and the actual values for the counts of data lines for each of P"' time intervals for the points in the third sequence;
   repeating the retaining, providing, calculating and applying for all time intervals $P'_i$, i∈[1, Q], Q<P, Q being a selection of points in the third sequence;
   retaining, as a best breakpoint for the third sequence the time interval $P'_i$ closest to the last time interval in the third sequence and yielding a calculated fourth error below a predetermined value R; and
   storing the best breakpoint for the third sequence, in the Breakpoint table.

12. The system of claim 7, wherein the Table Analyser component is further configured to perform after the retaining the best time column for the first data table:
   selecting a column of the first table other than a column with a time dimension;
   counting data lines per time interval for each of the values in the selected column;
   retaining as a category each of the values for which the total count of data lines exceeds a predetermined number S, and the count of data lines per time interval exceeds a predetermined number T for at least a predetermined percentage U of the time intervals for the selected column;
   forming a sequence of points for each category, each point having as one dimension the time interval and as another dimension the count of data lines per time interval for the value of the category; and
   storing the sequence for each category in the Data table.

* * * * *

UNITED STATES PATENT AND TRADEMARK OFFICE
CERTIFICATE OF CORRECTION

PATENT NO. : 11,288,260 B2
APPLICATION NO. : 17/306265
DATED : March 29, 2022
INVENTOR(S) : Nicol et al.

It is certified that error appears in the above-identified patent and that said Letters Patent is hereby corrected as shown below:

In the Claims

Column 20, Claim 1, Lines 7-8, should read --calculating, by an Anomaly Detector, for a first selection of time intervals in the third sequence, a confidence--

Signed and Sealed this
Twentieth Day of December, 2022

Katherine Kelly Vidal
*Director of the United States Patent and Trademark Office*